United States Patent Office 3,457,059
Patented July 22, 1969

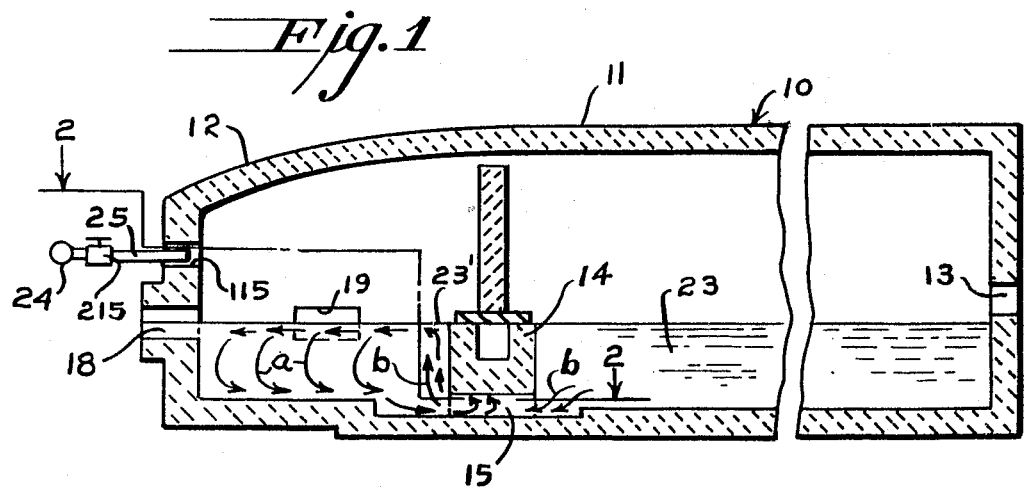
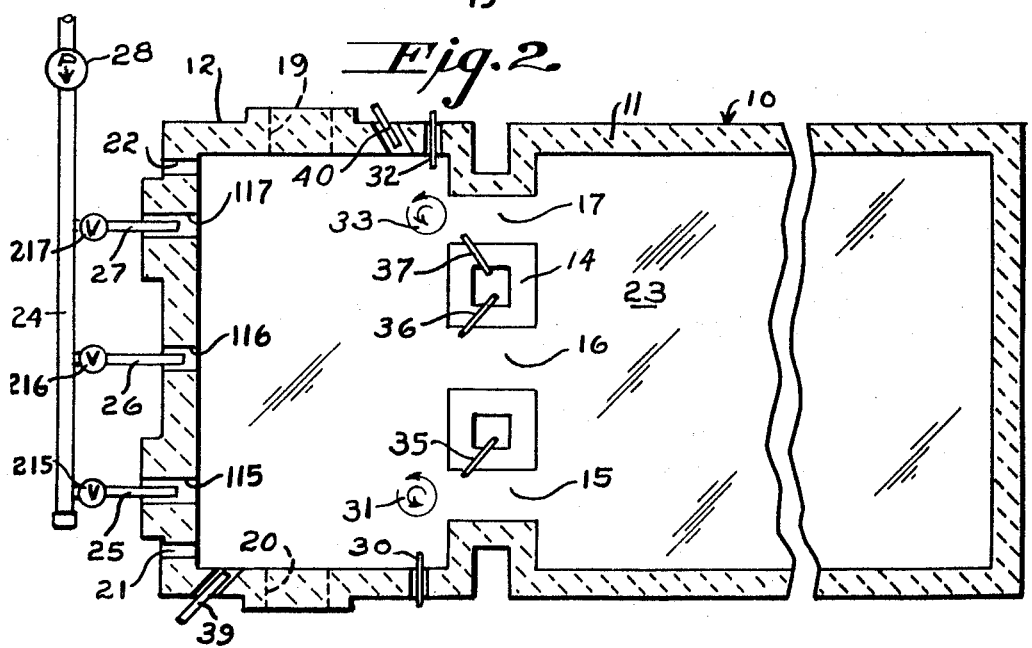

3,457,059
FLOW CONTROL OF MOLTEN MATERIAL IN A GLASS FURNACE
George B. Boettner, Corning, N.Y., assignor to Corning Glass Works, Corning, N.Y., a corporation of New York
Filed Mar. 19, 1962, Ser. No. 180,677
Int. Cl. C03b 5/30
U.S. Cl. 65—161                                   1 Claim This invention relates to a method of and apparatus for controlling the flow of molten materials, and more particularly to the control of the proportionment of flow of molten siliceous or glass-like material through a plurality of throats in a multiple throat bridge wall separating the melting zone and working or refining zone in a melting furnace.

Although the single throat bridge wall is standard in the glass industry, attempts have been made in the past to utilize multiple throat bridge walls in melting tanks. The expected result of increased production never materialized in the earlier attempts, however, since it was found that most of the flow tended to pass through one throat, on one side of the furnace, leaving the throat on the opposite side virtually idle, thus resulting in a negligible overall gain.

Recently it has been suggested that multiple throat bridge walls may be made operable by selectively applying heat to the various throats either indirectly by applying a flame to the external surface of the bridge wall throat, or directly by utilizing electrodes internally of the throat passages, to control the flow therethrough. Although operable results are obtainable, the control of flow of molten material through a plurality of throats by selectively applying heat to the throats themselves is not completely satisfactory. When heat is supplied to the exterior surface of the bridge wall to retard heat loss from the throat, for example, the amount of heat reaching the interior of the throat is virtually negligible due to the low heat conductivity and thickness of the refractory bridge wall.

Electrode heating, on the other hand, not only is expensive to install, but is costly to operate and maintain. In addition, although adequate control sufficient to maintain balanced flow once it is obatined is usually produced by such heating, electrical power is unsatisfactory to initially balance the flow when an out of balanced condition does occur. Also, the electrode material utilized in the heating units must be carefully selected for each glass composition to be melted, since certain glass compositions corrosively attack and consume various electrode materials which results in a deleterious affect on the glass. Accordingly, once an electrode installation is made for crtain type of glass composition, in order to melt an entirely different glass composition, it is often necessary to completely remove and reinstall new electrodes made of a material compatible with the new composition to be melted. Then too, certain glass compositions are completely incompatible with virtually all known electrode materials.

My invention obviates the difficulties encountered with electrical heating, and pertains to a simple and inexpensive manner of controlling the proportionment of flow of molten glass through a pluraltiy of submerged throats formed in a multiple throat bridge wall separating the melting zone and working or refining zone of a glass tank, wherein the temperature is varied in certain portions of the working zone by differentially cooling or heating such portions of the refiner.

It thus has been an object of my invention to provide an improved solution to the problem of controlling the proportionment of flow of molten glass-like material through a plurality of passages.

An additional object of my invention has been to obviate the problems heretofore encountered in controlling the flow of molten glass-like material through a plurality of submerged passages in a multiple throat bridge wall.

A further object of my invention has been to provide a simple and inexpensive method of and means for controlling the flow of molten vitreous material and the like through a plurality of passages.

A still further object of my invention has been to control the proportionment of flow of molten vitreous or glass-like material through a plurality of passages by differentially varying the temperature within the vicinity of the exit end of certain of the passages.

Another object of my invention has been to control the proportionment of flow of the molten vitreous material through a plurality of passages by varying the rate of flow of the inherently existing convection force or flow patterns directing material more dense and viscous than that flowing through the passages backwardly into the hot exit end of certain of the passages.

These and other objects of my invention will be more apparent to those skilled in the art from the following disclosure and accompanying drawings in which:

FIGURE 1 is a side elevational view in section of a glass melting tank having a multiple throat bridge wall and control means embodying my invention, wherein the section is taken along a center line of one of the throats;

FIGURE 2 is a plan view taken along lines 2—2 of FIGURE 1.

Referring now to the drawing and particularly FIGURES 1 and 2, a melting furnace or glass melting tank 10 is shown comprising a melting zone 11 and a working or refining zone 12. The melting zone 11 has a charge opening 13 formed in the back wall thereof for the introduction of raw material or batch. A multiple throat bridge wall 15, extending transversely across the furnace 10, separates the melting zone from the refiner or working zone 12. A plurality of submerged throats or passages 15, 16, 17, formed in the bridge wall 14, extend between and communicate with the melting zone 11 and the working zone 12.

The working zone is provided with a plurality of forehearth openings or connections, of which three such openings 18, 19, and 20 are shown. In addition the forward wall of the refining zone 12 is shown provided with the usual sight openings 21 and 22. A plurality of openings 115, 116, 117 are formed through the front wall of the working zone above the surface 23′ of glass 23 in alignment with throats 15, 16, and 17 respectively. Nozzles 25, 26, and 27, respectively, project into openings 115, 116, and 117. The nozzles 25, 26, and 27 are respectively connected through valves 215, 216, and 217 to a header or fluid carrying conduit 24 having a suitable blower or pump means 28 connected thereto.

In the operation of multiple throat bridge walls it has been found that the center throat carries its proportionment of the total flow through the total bridge wall regardless of the pull of the tank. This is probably due to the fact that the glass passing through the center throat is at a mean temperature between the temperatures at the opposite sides of the tank. The outer throats on opposite sides of the tank, however, have a tendency to become out of balance, with the throat or throats on one side of the tank carrying a greater load or proportionment of total flow than the throat or throats on the opposite side of the tank. When the outside throats become out of balance, he throat carrying the greatest load becomes hotter, due to the increased flow which increases the fluidity of the glass in this region thereby accelerating the out of balance; whereas the throat on the opposite side of the tank, which is carrying the least load, becomes cooler and accordingly the glass in this region becomes more viscous thus aggravating the situation by decreasing flow even further.

Several methods have been devised for determining the relative amounts of glass flowing through each of the outside throats. Since the glass is hotter in the melting zone than in the working zone, when glass is flowing through the throats pools of hot glass are formed in the working zone adjacent the exit end of the throats, which are appreciably hotter than the balance of the glass in the refiner. By positioning a pair of radiation pyrometers 30 and 32, through suitable openings formed in wall portions of the refiner, so that they are directed toward pools 31 and 33 respectively, formed adjacent the exit end of passages 15 and 17, readings may be taken as to the relative temperatures of the surfaces of pools 31 and 33 to give a practical indication of the relative flows through throats 15 and 17.

In a like manner, and as an alternative mode of comparing relative flow, thermocouples such as 35, 36, and 37 may be positioned to respectively extend into throats 15, 16, and 17 adjacent an upper portion thereof near the exit or working zone end. As flow increases through a throat on one side of the furnace, the thermocouple positioned in such throat will produce a higher reading than the thermocouple in an opposite throat where flow is decreased, thus indicating an out of balanced condition.

In operation, when all throats are carrying a proportionate share of the total flow through the bridge wall, the sensing or detecting devices such as radiation pyrometers 30, 32 or thermocouples 35, 37, will indicate a balanced condition and no external control is required. However, when the flow through the outside throats 15 and 17 becomes unbalanced, the detecting devices will indicate this fact and the appropriate valve 215 or 217 is actuated to introduce a cooling media, such as a stream of fluid, via the appropriate nozzle through opening 115 or 117 to cool a selected portion of the working zone within the vicinity of the faster flowing throat.

When throat 15, for example, carries a greater quantity of flow than throat 17, valve 215 is actuated to deliver a cooling flow, such as a stream of air, through nozzle 25, opening 115, and over the surface 23' of the glass retained in the refiner in the vicinity of throat 15. The surface of the molten glass retained within the working zone, within the vicinity of throat 15, is cooled and becoming more dense flows downwardly and rearwardly, accelerating the movement of existing convection flow or force patterns as shown by the arrows $a$ in FIGURE 1, which are produced by the differential in temperature between the melting and refining zones. This cooled glass is of course more viscous than the hot molten glass flowing through the throat from the melting zone 11, represented by arrows $b$. Accordingly, as this more viscous glass is urged or directed backwardly toward the exit end of the throat 15, it cools the glass flowing through the throat toward the working zone and retards the flow therethrough.

Since, as previously mentioned, the center throat consistently carries its proportionate share of the entire flow, a control valve and nozzle for this throat is not necessary for proportioning the flow, however, it may be of value in controlling the temperature of the working zone at high flow rates. The header 24 may be connected to any suitable source of fluid under pressure, such as combustible mixture if heating is desired, or if the composition of the glass being melted requires, it may be connected to an oxidizing gas, a reducing gas, or an inert gas. However, in most cases, the ambient atmosphere will suffice and the header 24 may be merely supplied with a blower or pump 28 to collect and supply such ambient atmosphere under pressure to the various nozzles.

As shown, the nozzles 25, 26, and 27 are positioned so as to direct the cooling fluid over the surface of a selected portion of the molten glass contained with the refiner and toward certain of the throats. Although these nozzles are in vertically offset axial alignment with the various throats, they could be angularly positioned within the sight holes 21 and 22 so as to direct a stream of cooling fluid over the surface of the glass in the vicinity of throat 15 and 17 respectively; or alternatively, they could be positioned through sidewalls of the refiner and directed toward the various throats as shown at 39 and 40. I have found that applying between 10 and 50 c.f.m. of cooling air at room temperature within the vicinity of a hot throat will bring the throat back into balance within a period of approximately 10 minutes.

Although the control valves such as 215 and 217 may be manually actuated, upon an indication of out of balance by the sensing devices, such as the radiation pyrometers 30, 32 or the thermocouples 35, 37, these valves may be automatically energizable proportioning valves, actuated in response to variations detected by the thermocouples or radiation pyrometers. A pair of sensing or detecting devices such as the radiation pyrometers or thermocouples as shown in FIGURE 2, may be connected to the input terminals of a suitable "zero" center recorder in such a manner so that the recorder merely indicates the difference in the temperature between the outside throats being measured. A pair of power actuated proportioning valves may be connected to terminals of the recorder by means of suitable leads.

Assuming that one sensing device is positioned to measure the temperature of throat 15 and the other sensing device is positioned to measure the temperature of throat 17, the indicator or recorder would move when the flow through the outside throats becomes unbalanced, and one proportioning valve would be actuated in response to the out of balanced condition detected by the sensing devices to permit a stream of cooling fluid to enter and cool a portion of the working zone and control the proportionment of flow through the various throats.

Although I have disclosed a preferred embodiment of my invention, it will be apparent to those skilled in the art that various changes and modifications may be made thereto without departing from the spirit and scope of the appended claim.

I claim:

1. A glass furnace for producing molten glass and the like comprising, a melting zone for forming a bath of molten glass-like material and a refining zone for working such molten material, a plurality of submerged passages communicating between said melting zone and said refining zone for passing a plurality of flows of such molten material from the melting zone to the refining zone, a plurality of fluid-carrying conduit means communicating with said refining zone above the surface of molten material contained therewithin for directing a gaseous flow in a substantially countercurrent direction above the flows emanating from each of said submerged passages, and control means for varying the amount of gaseous flow from each of the fluid carrying conduit means to control the distribution of flow passing through said plurality of submerged passages.

References Cited

UNITED STATES PATENTS

| | | | |
|---|---|---|---|
| 2,098,625 | 11/1937 | Homiss | 65—137 |
| 2,121,958 | 6/1938 | Forman et al. | 65—137 |
| 2,866,838 | 12/1958 | Paxton | 65—162 |
| 2,081,595 | 5/1937 | McIntosh | 65—162 |
| 2,119,947 | 6/1938 | Blav et al. | 65—134 |

DONALD H. SYLVESTER, Primary Examiner

ARTHUR D. KELLOGG, Assistant Examiner

U.S. Cl. X.R.

65—135, 136, 137, 162, 339, 342, 346, 347